P. M. LINCOLN.
ELECTRIC WATTMETER.
APPLICATION FILED MAY 18, 1915.

1,258,346.

Patented Mar. 5, 1918.
2 SHEETS—SHEET 1.

P. M. LINCOLN.
ELECTRIC WATTMETER.
APPLICATION FILED MAY 18, 1915.

1,258,346.

Patented Mar. 5, 1918
2 SHEETS—SHEET 2.

WITNESSES
J. Herbert Bradley
Edwin O. Johns

INVENTOR
Paul M. Lincoln
By F.W.H. Clay
his atty.

UNITED STATES PATENT OFFICE.

PAUL M. LINCOLN, OF PITTSBURGH, PENNSYLVANIA.

ELECTRIC WATTMETER.

1,258,346.  Specification of Letters Patent.  Patented Mar. 5, 1918.

Application filed May 18, 1915. Serial No. 28,831.

*To all whom it may concern:*

Be it known that I, PAUL M. LINCOLN, a citizen of the United States, residing at Pittsburgh, in the State of Pennsylvania, have invented certain new and useful Improvements in Electric Wattmeters, of which the following is a specification.

My invention relates to electric measuring instruments more particularly designed for measuring power on the basis of a mean demand or average demand integrated over a predetermined short time period. The primary objects are to produce an instrument for measuring the electric power used, in approximate proportion to the real cost of supplying the power, for which purpose I propose to take cognizance of several elements or factors not heretofore employed. Another object is to improve the electric circuits used and to provide efficient means for combining certain current effects as will hereinafter appear. The invention is illustrated in the accompanying drawings, in which:

The invention is based upon the theory that the most equitable and logical basis for charging a customer for electric power supplied, is the accumulated effect of the energy flowing over a predetermined short time interval; that is what I have in other patents called a "logarithmic average indication."

In obtaining it I provide for the use of two currents derived from the circuit to be measured, one of these currents being proportional to the amperage, and the other proportional to the voltage in the main circuit. I arrange in various ways to combine the effects of these currents in such a way that one element of an energy absorbing device operated by such currents, is actuated in proportion to the additive effects of these derived currents, while another of such elements is actuated in proportion to the difference between the effects of the two derived currents. Particularly I use the energy of the derived circuits either directly or indirectly to produce heat in an expansion chamber, and employ the algebraic sum of the expansions to move an indicator, which therefore of course is moved in proportion to the wattage. In all cases I provide for a definite and adjustable amount of lag in the indication. That is, the arrangement is such that after the flow of a given current through the energy absorbing device, an appreciable, definite and adjustable time elapses before the full effect of a flow is recorded in the indicator.

Figure 1:
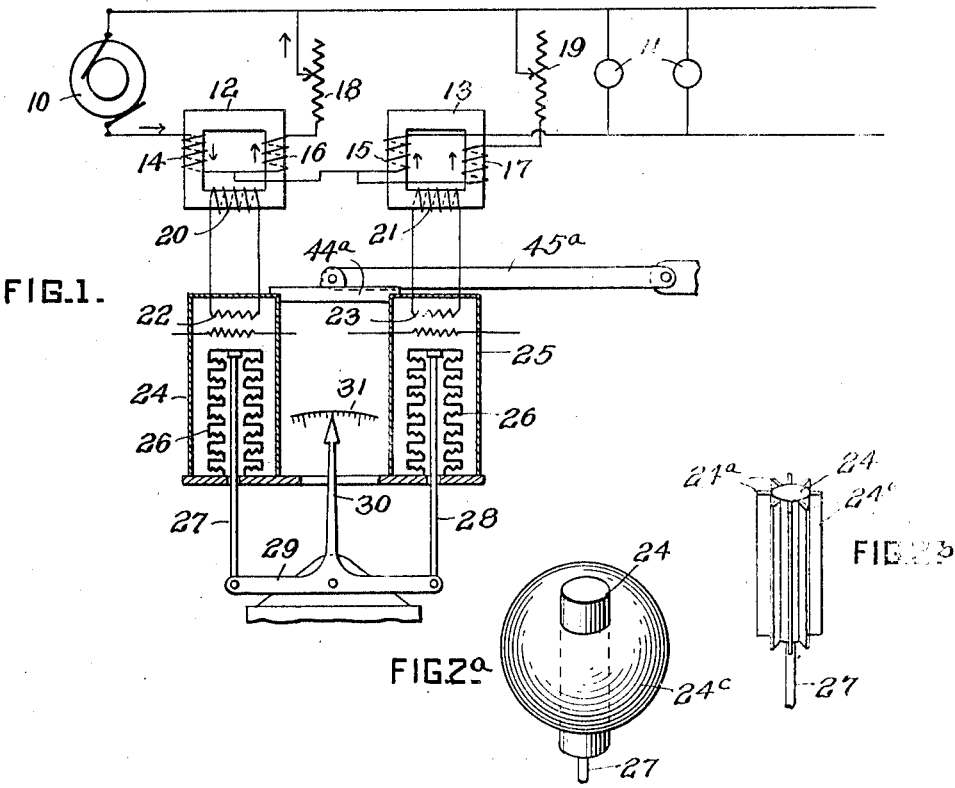
Figure 1 is a diagram, with a partial side elevation and partial section, of an arrangement for measuring wattage.

In Fig. 1 I represent at 10 a generator feeding a line including the loads 11. In series in this line are the transformers 12 and 13, each of which has two primary windings. In the transformer 12 the primary winding 14, and in transformer 13 the primary winding 15, are in series in the line (or obviously may be in series in a derived circuit,—the only thing necessary being that the currents in these coils are strictly proportional to the currents in the line to be measured).

The primary windings 16 in transformer 12, and the primary windings 17 in transformer 13, are parts of shunt circuits respectively, which may contain the resistances 18 and 19. It is obvious therefore that on the transformer 12 the secondary 20 will have a current proportional to the sum of the current in coil 14 and the current in coil 16, both of which are shown wound clockwise with respect to the core. That is to say the voltage effect and the amperage effect will be added together by magnetic induction effects to produce the current in coil 20. On the other hand the coil 21 in the transformer 13 will have amperage effect and voltage effect subtracted from each other, the current in coil 21 being due to the difference between the magnetic induction effects of coils 15 and 17 on account of the oppositely arranged windings as shown. In this instance the effects of the derived currents are combined by magnetic induction to induce by transformer action two currents and these are employed to heat coils; and the expansion effects of this heat are combined and recorded as follows: I provide two chambers of oil or other easily expansible liquid such as 24 and 25, in which there are located respectively the heating coils 22 and 23 in circuit respectively with secondaries 20 and 21. The vessels 24 and 25 have a reëntrant chamber 26 composed of a nest of corrugated diaphragms preferably of the form shown, so that the expansion of the liquid in the chambers 24 and 25 will cause the upper end of the nests 26 to rise or fall in proportion to the amount of heat the liquid receives in each case. The cylinders are joined by a strut $44^a$ pivoted to a pivoted link $45^a$ in order to provide for any common movements of these cylinders due to external influences without affecting the indication. These nests of diaphragms 26 are attached to rods 27 and 28 pivoted on the two ends of beam 29 carrying a pointer 30, traveling over a scale 31.

Figure 2:
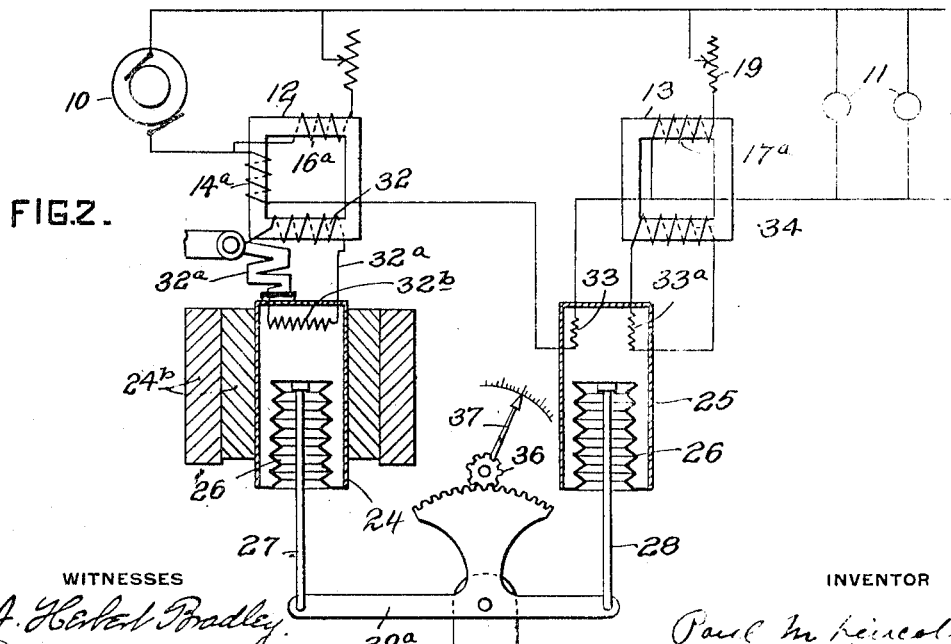
Fig. 2 is a similar diagram and view of a modified form of the apparatus, and Figs. 2ª and 2ᵇ illustrate further modifications of the means for regulating the ratio of heat absorbing to the heat radiating power of the elements 24, 25 in Fig. 1.

The time of response of this wattmeter will depend upon the ratios between the rate of heat absorption and the rate of radiation of the liquid in the chambers 24 and 25, and this it will be understood should be carefully adjusted in building the instrument, and should be definitely known. Variation in the time of response is secured in any convenient way, as for example illustrated in Figs. 2, $2^a$ and $2^b$, where the cylinder containing the liquid is surrounded in some cases by heat absorbing bodies, and in other cases by heat radiating bodies, such as the radiating wings $24^a$ in Fig. $2^b$. The extra heat absorbing or heat storage bodies may be in the form of heavy rings $24^b$ as shown in Fig. 2, or a metal sphere $24^c$ as in Fig. $2^a$. It will be understood that I may employ an unlimited number of variations of form in these devices, the object of which is to increase or diminish the ratio of the energy absorbing element's ability to store heat, as compared to its ability to dissipate heat. In some cases a shorter lag may be necessary, that is the time of response will be in some cases required to be quite short, and in such cases I prefer to employ "thermal shunting."

I have in other publications shown that the differential temperature between two similar connected bodies having heat applied to them at different rates follows the same transient time law as a single body maintained in a uniform environment. When the time becomes very large, the difference of temperature is proportional to the difference in rate of heat application, and the differential temperature approaches its final value along a logarithmic curve. It attains 63.2 per cent. of its final value in a time equal to mass divided by surface into radiating power per unit surface plus two times the conductivity of the thermal connection between the two bodies.

Figure 4:
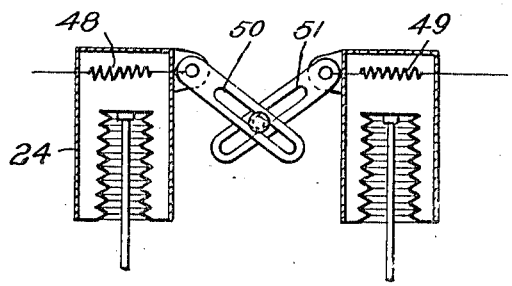
Fig. 4 is a sketch indicating the method of thermal shunting for more delicately adjusting the time of response.

Expressed as a formula, this means $$t = \frac{M}{SE + 2Q}$$

where M is the amount of heat stored in one of the bodies per degree of temperature rise; S represents the square centimeters of surface; E the heat radiating power per degree per square centimeter, and Q the thermal conductivity of the connecting shunt. From this it will appear that the time of response may be easily regulated by changing the quantity Q; that is, by simply regulating the conductivity of a thermal conductor connecting the two heated masses. A convenient means of doing this is represented in Fig. 4. It will be understood that if the heat imparted to the coil 48 is in part effective to heat the oil in the chamber 24, and in part conducted to the other coil 49 through the conducting bars 50, 51, at a certain rate, then the amount of the heat which is effective to cause an apparent difference in the expansion of the two chambers 24 and 25 can be easily regulated by varying the heat conductivity between the coils 48 and 49, as by sliding the bars 50, 51, on each other to change the conductivity. By this thermal shunting we may make finer variations in the time lag of the response; and in all cases the indication of the instrument at any moment will show a known proportion of the ultimate or ideal heating effect of the coils 48 and 49, providing the value of the time lag is known.

In Fig. 2 I have shown a slightly different arrangement of circuits, and a convenient method of varying the heat storage capacity of the expansion tubes, and therefore the time lag. As before I use here two transformers, 12 and 13, in the main circuit containing the generator 10 and loads 11. The transformer 12 has the two primaries $14^a$ and $16^a$, and by means of a secondary 32 I take off a current proportional to the sum of the voltage effect and the amperage effect. By this current I heat the oil in cylinder 24 by means of a coil $32^b$. The transformer 13 has the primary $17^a$ as shown, and the secondary 34 thus takes off a current proportional to the voltage. The oil in cylinder 25 is heated by means of two resistances 33 and $33^a$; the coil 33 being in series with the main circuit and the coil $33^a$ in circuit with the said secondary 34. Of course this resistance $33^a$ might if desired be directly in the shunt circuit $17^a$, 19.

In this instance, the cylinders 24 and 25 are held against any other than a vertical movement by means of the form of the leads connected to the heating coils. As shown, for example, to the left of Fig. 2, the lead $32^a$ may be in the form of a split flexible plate fixed at one end to the tube 24, and held rigidly at the other under binding posts as shown.

Obviously the cylinder 24 will have an energy loss proportional to the square of the algebraic sum of the superposed effects of coils 14ª and 16ª,—that is the currents due respectively to amperage and to voltage in the main circuit. On the other hand the cylinder 25 will have an energy loss proportional to the sum of the squares of the same quantities. The relation may be written:

$$W = 1/2[(E \pm I)^2 - E^2 - I^2],$$

in which W represents watts, E the voltage, and I the amperage of the circuit being measured.

The collapsible chambers 26 located within the cylinders 24 and 25 are attached as heretofore described to the rods 27 and 28, which will thus actuate the arm 29ª and move the gear segment 35 and pinion 36 with pointer 37 in such manner that the difference in temperature between the two cylinders 24 and 25 will be indicated. This of course is an indication proportional to the watts. The heat absorbing and radiating qualities of the tubes may be modified as heretofore described, being in this instance shown as loaded by the heavy cylinders 24ᵇ slipped over the tubes.

Figure 3:
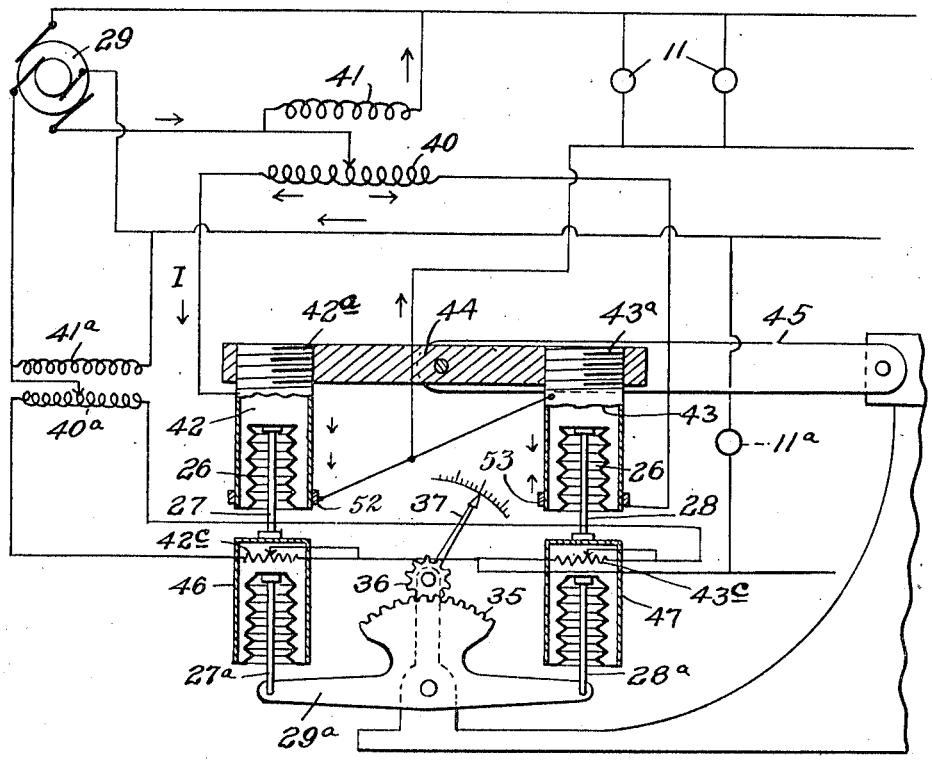
Fig. 3 is a diagram and partial vertical section showing another method of arranging the circuits and constructing the moving parts of the energy absorbing elements of the wattmeter.

In Fig. 3 I have shown an arrangement in which the derived currents are directly superposed, and the effects of several derived circuits are combined mechanically.

29 represents a two phase generator, one phase supplying the loads 11, and the other the load 11ª. In the first circuit I place a coil 40, both parts of which are in series in the circuit, and a coil 41, which is in shunt, arranging these two coils to act as a transformer, of which coil 40 is the secondary. The series current will pass through the cylinders 42 and 43, which in this instance themselves act as resistances. The voltage current derived through coil 40 by induction from the shunt coil 41, will pass through the same cylinders, but through both in the same direction, whereas the series current will pass through in opposite directions. That is, the voltage current is additive to the amperage current in cylinder 42, while in cylinder 43 the voltage current and amperage current oppose each other.

The expansion of the nests of diaphragms 26 will take effect in a manner similar to that heretofore described, by moving the pointer 37 in proportion to the watts of the circuit being measured. For convenience of mechanical embodiment I provide cylinders 42 and 43 with extensions 42ª and 43ª in the form of screw threads, which engage threaded sockets in the bar 44. This bar meantime is pivoted to a pivoted supported link 45 in order that the vertical movements of the two expansion chambers together may be in a vertical line.

Now, if it were desired to use the other phase of the current in making the indication, or if it were desired to measure the energy of some other circuit at the same time, additional resistances obviously might be placed in the cylinders 42 and 43 without limit. Thus the effects might be combined by thermal addition of the thermal effects of as many currents as desired. This, however, would involve insulating the various resistances placed in chambers 42 and 43, which in some cases might introduce difficulties. I therefore have shown in this figure means for mechanically adding the effects.

Thus the other phase of the generator 29 may have in its circuit the transformer 40ª, 41ª, and the resistance coils 42ᶜ and 43ᶜ arranged as shown. And instead of the rods 27 and 28 being attached directly to the rocking arm 29ª as would be the case in dealing with but one circuit, they are attached to additional cylinders 46 and 47, which in turn have their respective rods 27ª and 28ª attached to the arm 29ª. Obviously the effect on this arm and therefore on the pointer 37 will be proportional to the algebraic sums of the differential expansions in the pairs of cylinders 42, 46 and 43, 47 respectively. In this way the wattage of any number of circuits may be combined at pleasure. The rings 52 and 53 that surround the cylinders 42 and 43, respectively, are adapted to be movable therealong for the purpose of varying the heating of the cylinders by changing the resistance in the heating circuit. Thus, the heat conductivity between the cylinders 42 and 43, and, consequently, the time lag of the response of the cylinders may be easily regulated.

In all the devices above described it will be seen that the wattage indication is obtained by combining in various ways the effects of the energy in two derived circuits, in one of which the current is proportional to amperage, and in the other of which the current is proportional to the voltage of the circuit to be measured. In the device of Fig. 3 it will be observed that the response is in accordance with the relation:

$$W \sim [(E+I)^2 - (E-I)^2],$$

where W signifies watts, E the volts, and I the current. That is, the oil in the cylinder 42 has a loss within it proportional to $(E+I)^2$, while in the cylinder 43 it has a loss proportional to $(E-I)^2$. Since the movement of pointer 37 represents the algebraic sum of the differential in temperatures of the two pairs of cylinders, it represents a quantity proportional to watts.

Having thus described my invention and illustrated its use, what I claim is the following:

1. In a wattmeter, the combination with heating devices adapted to be differentially heated by currents derived from the circuit to be measured, of means operatively connected between the heating devices for varying the time lag of response thereof.

2. In a wattmeter, the combination with energy-absorbing members, of adjustable means connected between the energy-absorbing members for varying the relative response of the said members.

3. In a meter, the combination with a plurality of energy-absorbing members, of means operatively connected therebetween for varying the relative response of the said members.

4. In a meter, the combination with two thermal-responsive devices, of means connected therebetween for varying the time lag of response thereof.

5. In a wattmeter, the combination with two thermal-responsive devices adapted to be expanded by the absorption of energy, and means for indicating the relative expansion of the said devices, of means connected between the said devices for varying the time lag of the response thereof.

6. In a wattmeter, the combination with two thermal-responsive devices adapted to be expanded by the absorption of energy and means for indicating the relative expansion of the said devices, of adjustable thermal-conducting means operatively connected between the said devices.

In testimony whereof I have hereunto signed my name in the presence of the two subscribed witnesses.

PAUL M. LINCOLN.

Witnesses:
W. A. HECKMAN,
EDWIN O. JOHNS.